United States Patent Office 3,610,065
Patented Oct. 5, 1971

3,610,065
POWER TRANSMISSION GEAR SYSTEM
Teru Hayashi, 4-413 Minami Tsunajimacho, Kitaku, Yokohama (Kanagawa Prefecture), Japan, and Takashi Takahashi, 1-458 Soshigaya, Setagayaku, Tokyo, Japan
Filed Oct. 23, 1969, Ser. No. 868,951
Int. Cl. F16h 57/00; F16c 7/04
U.S. Cl. 74—410
1 Claim

ABSTRACT OF THE DISCLOSURE

In power transmission gear system consisting driving pinion, driven gear and two intermediate gearings, the shaft of the driving pinion is supported by bearings which enable said shaft to displace in an inclined plane making an angle $\alpha$ (mesh pressure angle) with the plane including the axial lines of the driving pinion and the driven gear.

---

In large power transmission gear system, it is advantageous to provide two intermediate gears between driving and driven gears instead of transmitting torque directly from driving pinion to driven gear, because as thickness of gears can be decreased, the weight of the system can be reduced whereby manufacturing cost can be much saved. However, a problem arises in that due to unavoidable engineering errors, if one of the gears is slightly leading the other, that gear will take the entire load to the exclusion of the others, which would inevitably result in excessive wear or premature destruction. The difficulty which has to be overcome in using any system of locked trains of gears is substantial because any condition of unbalance as between one or other of the gears transmitting power will result in excessive wear.

This invention has for its object to obtain balanced engagement of teeth of power transmission gear system in which two intermediate gears are employed by novel and simple means.

Figure 1:
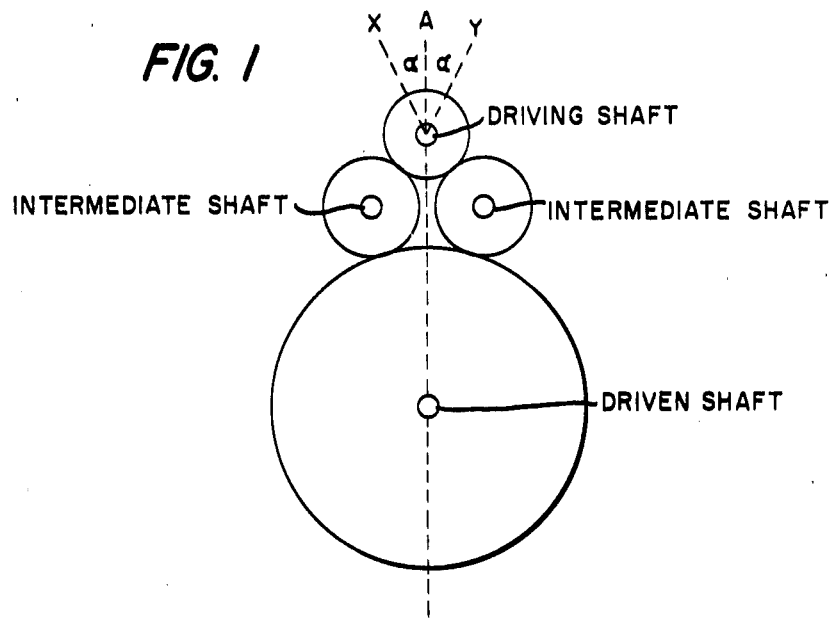
Figure 2:
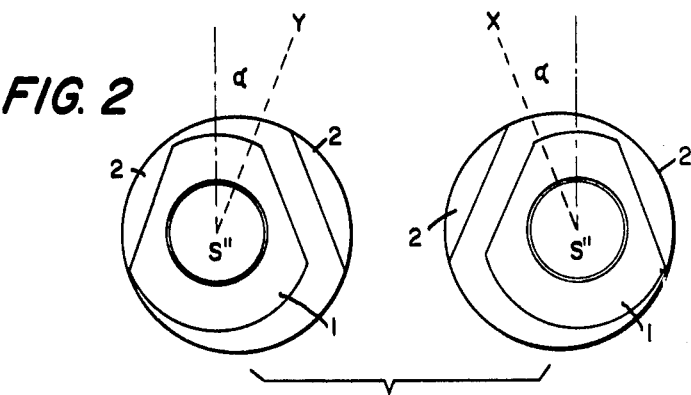
Figure 3:
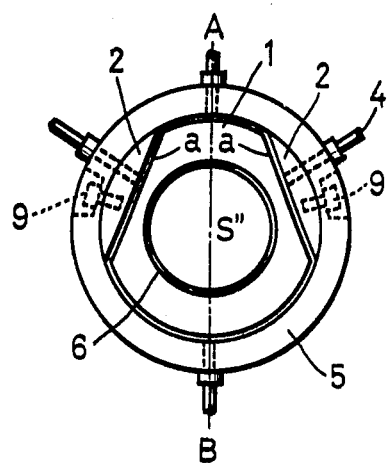
Figure 4:
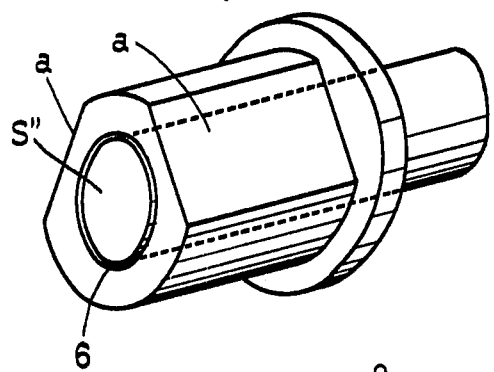
Figure 5:
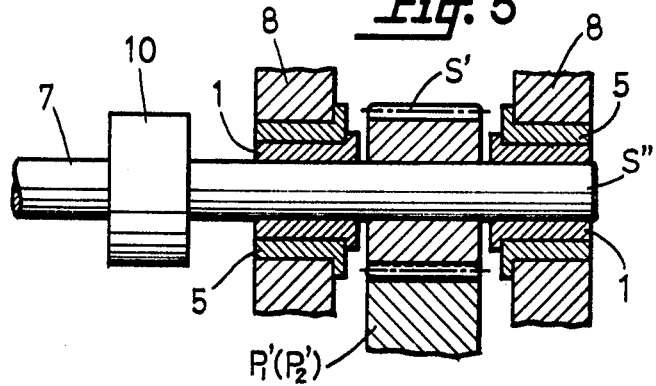

For an understanding of the invention principles, reference is made to the following description of a typical embodiment thereof as illustrated in the accompanying drawings in which FIG. 1 shows diagrammatically the principle of this invention, FIG. 2 shows diagrammatically the displacement of the driving pinion, FIG. 3 is a sectional view of the bearing of the driving pinion, FIG. 4 is a perspective view of the sleeve of the shaft of the driving pinion, and FIG. 5 is a sectional view of the assemblage of the driving pinion, driving shaft and bearings.

In FIG. 1, S is the center of the driving pinion S', $P_1$ and $P_2$ are the center of the intermediate gears $P'_1$ and $P'_2$ respectively, R is the center of the driving gear R', $\alpha$ is the angle of mesh pressure $\theta$ is the angle formed by line S–R and line S–$P_1$ or S–$P_2$ and X, Y are coordinates drawn with their zero point at S, X-axis coinciding with line S–R.

Suppose $E_1$ be assumed blacklash due to engineering errors of the train of gears consisting of S', $P'_1$ and R', and $E_2$ be assumed blacklash of the other train of gears consisting of S', $P'_2$ and R'. Said backlash includes total sum of jolting, loosening and bending of teeth due to engineering errors.

Suppose $F_1$ be the backlash of the first train of gears consisting of S', $P'_1$ and S' due to the displacement $x$ of the pinion S' along the X-axis and $F_2$ be the backlash of the second train of gears consisting of S', $P'_2$ and R' due to the displacement $y$ of the pinion S along the Y-axis.

The magnitudes of $F_1$ and $F_2$ can be defined $$F_1 = \cos (\theta - \alpha)/\cos \alpha \cdot x - \sin (\theta - \alpha)/\cos \alpha \cdot y \quad (1)$$

$$F_2 = \cos (\theta + \alpha)/\cos \alpha \cdot x + \sin (\theta + \alpha)/\cos \alpha \cdot y \quad (2)$$

From the condition of engagement of teeth, we get $$(E_2 - E_1) + (F_2 - F_1) = 0 \quad (3)$$

By applying Equations 1 and 2, we have $$E_2 - E_1 = 2 \cdot \sin \theta / \cos \alpha (-X \sin \alpha + Y \cos \alpha) \quad (4)$$

Since $(E_2 - E_1)$ depends on engineering errors, it varies incessantly as the gears rotate.

If the center S of the pinion S' were retained at a fixed position, $x$ and $y$ would be constant, then Equation 4 would not be established since the left side of said equation is variable while the right side of Equation 4 is constant, so, at least one of $x$ and $y$ should vary in accordance with the variations of the left side of the equation.

This is the first condition.

Next, the second condition was found as follows:

Suppose $f_1$ and $f_2$ be the loads in radial directions on S' caused by the gears $P_1$ and $P_2$ respectively, $f$ be reaction of the bearing and $\phi$ be the angle between the $f$ and X-axis.

The balance of the components of the forces along X-axis is $$-f \cos \phi + f_1 \cos (\alpha - \theta) + f_2 \cos (\alpha - \theta) = 0$$

and the balance of the components of the forces along Y-axis is $$-f \sin \phi + f_1 \sin (\alpha - \theta) + f_2 \sin (\alpha - \theta) = 0$$

by eliminating $f$ from the above equations, we have $$\operatorname{Tan} \phi = (f_1 \sin (\alpha - \theta) + f_2 \sin (\alpha + \theta)) / (f_1 \cos (\alpha - \theta) + f_2 \cos (\alpha + \theta))$$

or $$\operatorname{Tan} \phi = (\sin (\alpha - \theta) + (f_2/f_1) \sin (\alpha + \theta)) / (\cos (\alpha - \theta) + f_2/f_1) \cos (\alpha + \theta)) \quad (5)$$

In case of balanced load, $f_1 = f_2$ or $f_2/f_1 = 1$, so Equation 5 will be rewritten, $$\operatorname{Tan} \phi = (\sin (\alpha - \theta) + 1 \cdot \sin (\alpha + \theta)) / (\cos (\alpha - \theta) + 1 \cdot \cos (\alpha + \theta))$$

$$= 2 \cdot \sin \alpha \cdot \cos \theta / 2 \cdot \cos \alpha \cdot \cos \theta = \tan \alpha$$

therefore $$\phi = \alpha \quad (6)$$

This is the second condition.

In order to satisfy said two conditions, the bearing of the pinion S' should displace in a plane perpendicular to $f$. As shown in FIG. 2, to the outside of the bearing for the pinion S', a face plate is attached so as to slide on the plane inclined at the angle $\alpha$ to Y-axis.

In FIG. 2, when S displaces by amount $\epsilon$ along the sliding surface, we get $$x = -\epsilon \sin \alpha$$

$$y = \epsilon \cos \alpha$$

then Equation 4 can be rewritten as follows:

$$E_2 - E_1 = 2 \cdot \sin \theta / \cos \alpha (\epsilon \cdot \sin^2 \alpha + \epsilon \cos^2 \alpha)$$

or $$\epsilon = \cos \alpha / 2 \cdot \sin \theta (E_2 - E_1) \quad (7)$$

It will be clear that S will displace by the amount $\epsilon$ in accordance with the variation $(E_2 - E_1)$.

The bearing is preferably provided with another sliding surface symmertical to the first sliding surface for reverse rotation.

In FIGS. 3, 4 and 5, S'' denotes the shaft of the driving pinion S', both ends thereof being supported by bearings attached to frames 8 and 8. 10 is a gear coupling for transmitting torque of the driving shaft 7 to the shaft S" of the pinion S without restraining said shaft S". Each bearing 5 contains a tube 1 having two symmetrical sliding surfaces a and a. Within the bearing 5, two crescent pieces 2 are arranged symmetrically to the center line A–B, and are fixed by any suitable means such as rivets 9. The outer face of said crescent piece inclined to the line A–B with an angle which is similar to the angle of mesh pressure α. Within the tube 1, the shaft S" of the pinion S' is inserted with a metal sleeve 6. Lubricating oil is fed into the space between the periphery of the tube 1 and the inner surface of the bearing 5 through inlet 4.

As is clear from the above, during the movement of the invented power gear system, the shaft S" of the driving pinion S' displaces along one of the crescent pieces 2 together with the tube 1 so as to balance torque automatically among the gears.

What we claim is:

1. Power transmission gear system in which a drive from a driving shaft to a driven shaft is distributed through two parallel intermediate shafts, both of which are connected to the driving and driven shafts and the driving shaft adjusts itself automatically to equalize the load distribution through the two parallel intermediate shafts, characterized in that the axis of the driving shaft is disposed to one side of the plane containing the axes of the two intermediate shafts, the driving shaft is loosely inserted in a tube (1) having two inclined sliding surfaces (a) (a) on both sides thereof, the angle of the each inclination relative to the center line (AB) connecting the axes of the driving and driven shafts being equal to the angle of the mesh pressure (α), said tube is loosely inserted in a bearing (5) having two crescent pieces (2) (2) cooperating with the inclined sliding surfaces (a) (a) of said tube (1) and the movement of the axis of the driving shaft is effected in a plane perpendicular to the shaft of said driving shaft and along one of the inclined surfaces of the crescent pieces (2) (2).

References Cited

UNITED STATES PATENTS

| | | | |
|---|---|---|---|
| 1,499,332 | 7/1924 | Baumann | 308—9 |
| 2,496,857 | 2/1950 | Cronstedt et al. | 74—410 |
| 2,899,822 | 8/1959 | Matthews | 74—410 X |
| 3,146,629 | 9/1964 | Schmitter | 74—410 |
| 3,430,508 | 3/1969 | Pope et al. | 74—410 |
| 3,437,387 | 4/1969 | Dee | 308—9 X |
| 3,469,496 | 9/1969 | McCann et al. | 308—9 X |
| 3,472,565 | 10/1969 | Areneson | 308—9 |

LEONARD H. GERIN, Primary Examiner

U.S. Cl. X.R.

308—9